Dec. 19, 1939.        F. LIENHARD        2,184,049
PEDAL DRIVE, PARTICULARLY FOR CYCLES
Filed Aug. 23, 1938        3 Sheets-Sheet 1

Inventor
Fritz Lienhard
By Bilinger, atty.

Dec. 19, 1939.  F. LIENHARD  2,184,049
PEDAL DRIVE, PARTICULARLY FOR CYCLES
Filed Aug. 23, 1938  3 Sheets-Sheet 2
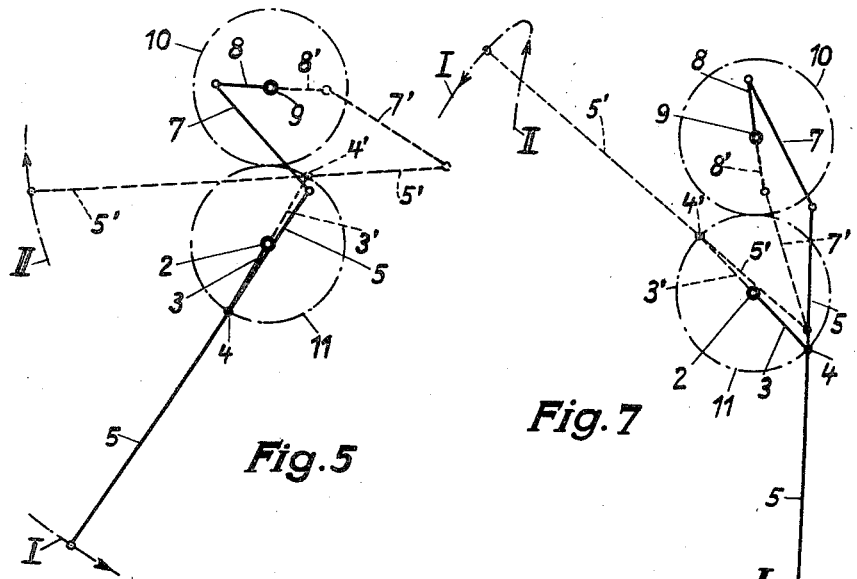
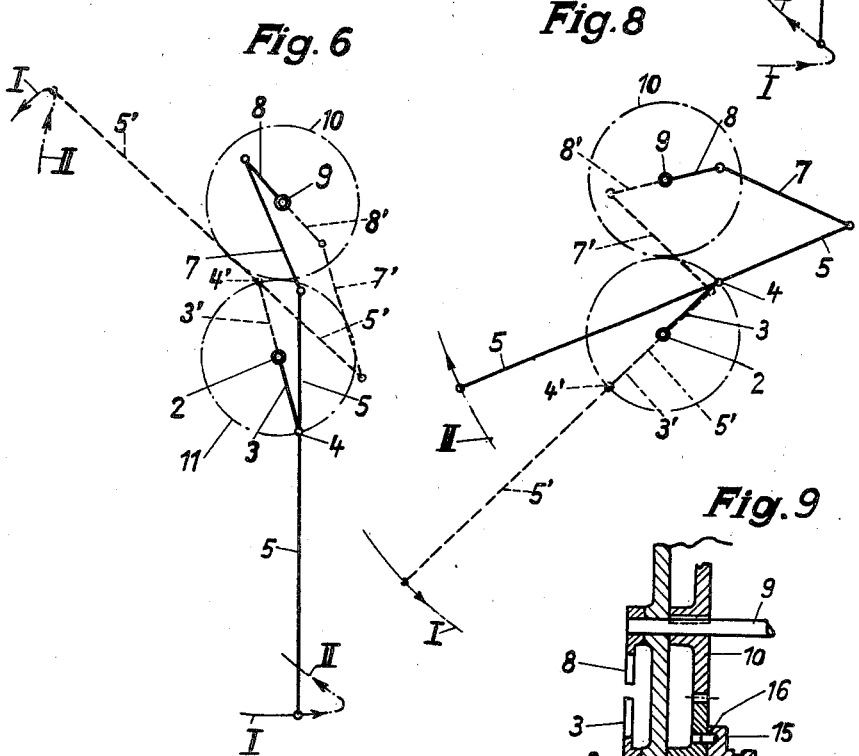

Dec. 19, 1939.  F. LIENHARD  2,184,049
PEDAL DRIVE, PARTICULARLY FOR CYCLES
Filed Aug. 23, 1938  3 Sheets-Sheet 3
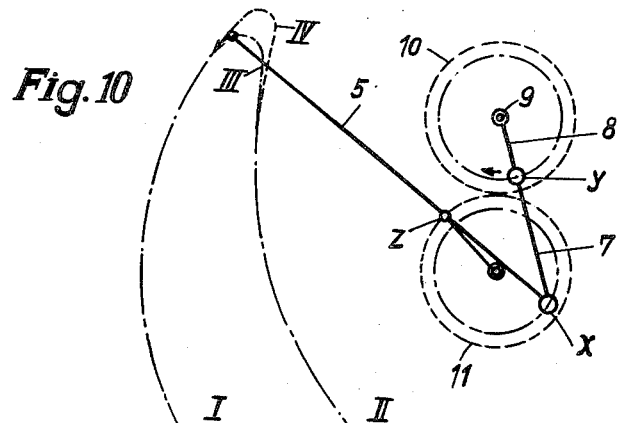
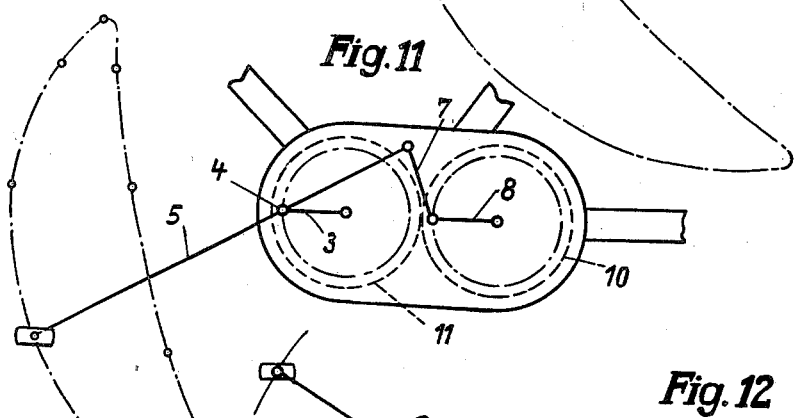
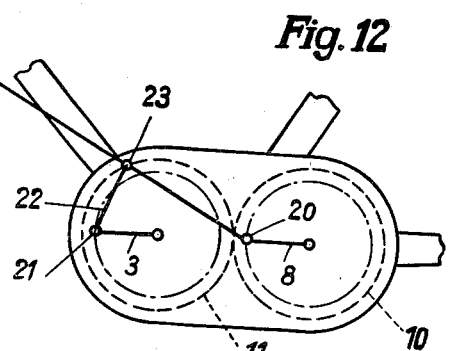
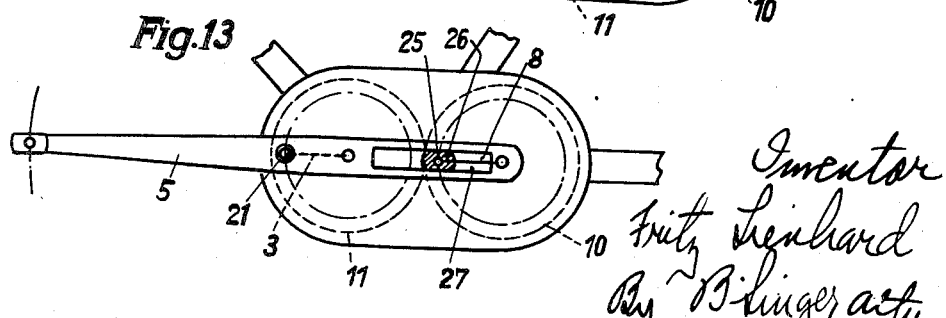
Inventor
Fritz Lienhard
By Bilinger, atty.

Patented Dec. 19, 1939

2,184,049

UNITED STATES PATENT OFFICE 2,184,049

PEDAL DRIVE, PARTICULARLY FOR CYCLES

Fritz Lienhard, Zurich, Switzerland, assignor of one-half to Ernst Gimmi, Zurich, Switzerland Application August 23, 1938, Serial No. 226,374

3 Claims. (Cl. 74—594.3)

This invention relates to pedal mechanism which may be applied especially to cycles and also to other pedal operated machines and the like. Pedal mechanisms are known which are provided with two pedals which oscillate upwardly and downwardly, which are relatively displaced and each of which is pivotally mounted on the pivot of a pedal crank.

The known constructions do not operate satisfactorily.

According to the present invention each pedal, rotatably mounted on a crank pin, is actuated by an actuating crank in such a manner that the pedal is moved automatically during its working stroke in an extended arc giving a long active lever arm effect as soon as the foot commences the operating stroke. In this method of actuation the pedal and the pedal crank form together during nearly the whole of the working stroke, an extended power arm. They move practically in parallel as long as the foot applies force to the pedal. When thus during the working stroke of the pedal, the pedal is coupled practically parallel to the pedal crank and consequently the effective lever arm of the foot is extended, the latter is again shortened during the return movement of the pedals.

The path of movement of the pedals during the downward movement constitutes almost a circular arc. During the return movement of the pedals, the pedal is disaligned from its parallel connection to the pedal crank and is again returned upwardly along the shortest path to the starting point of the working stroke.

This coupling of the pedals and pedal crank for the purpose of substantial parallelism is effected entirely automatically and without shock.

The advantage of this arrangement resides therein that the foot is used with a considerably longer and consequently more effective lever arm for transmitting the power.

The new drive may be so arranged that the working stroke of the pedals can be varied within comparatively wide limits, in such a manner that for example the rider is free at any time, even whilst travelling, to vary the path to be followed by the foot, this variation being adapted to be effected by moving the pedal relatively to the driving crank.

The pedal drive may be fitted with any suitable transmission gear.

The gear casing can be mounted pivotally in the frame so that the path of movement of the pedals can be displaced as a whole.

An example of construction of the subject of the invention is shown diagrammatically in the accompanying drawings, wherein:

Figs. 2 to 8 show various positions of some of the elements of the drive.

Fig. 9 shows a clutch device for the pedal crank.

Fig. 10 to 13 respectively show different diagrammatic modifications hereinafter specifically referred to.

Figure 1:
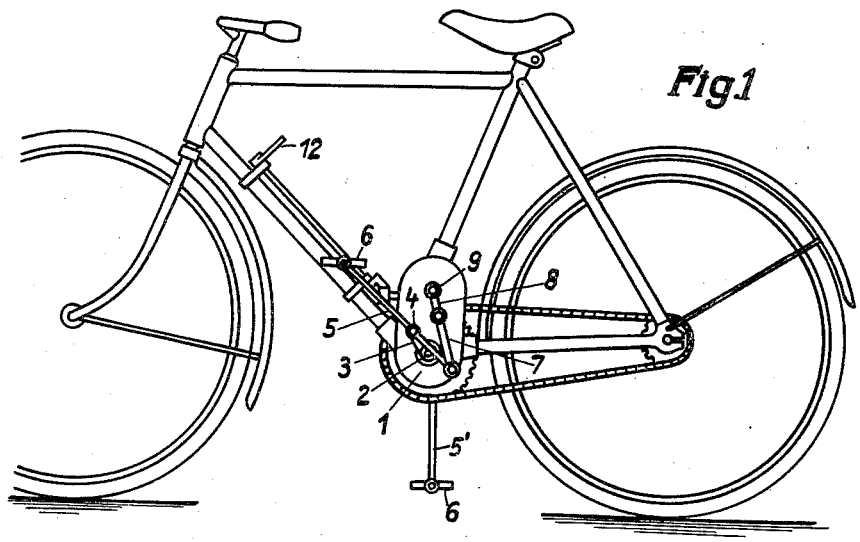
Fig. 1 shows a cycle in said elevation with the drive according to the invention.
Figures 2, 3:
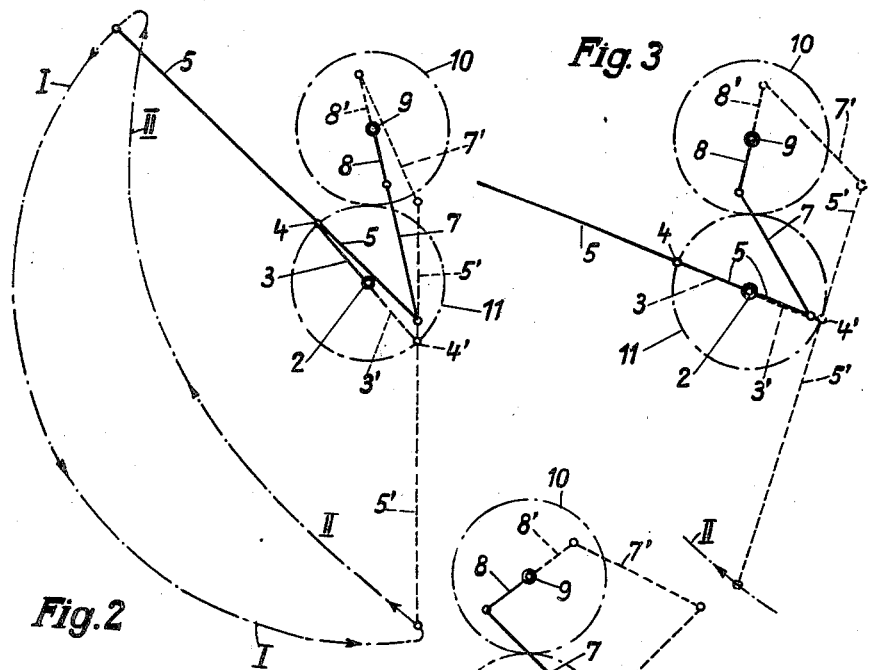
Figure 4:
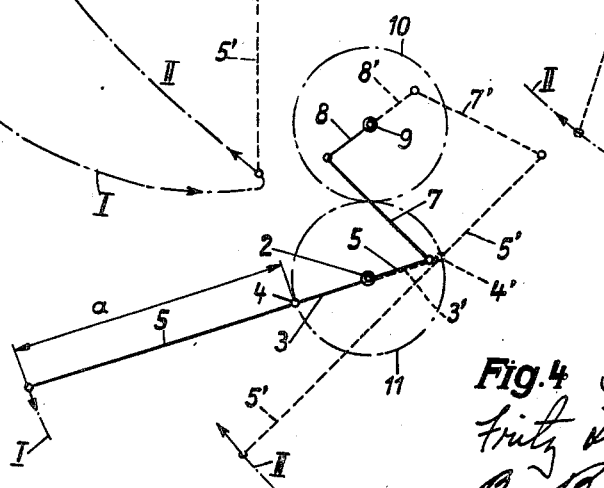

The drive shown is provided with a casing 1 in which is mounted a shaft 2. To the latter are secured pedal cranks 3, 3'. These cranks 3, 3' are relatively displaced by 180°. On each of the crank pins 4, 4' of the pedal cranks 3, 3' are rotatably mounted double-armed pedal levers 5, 5'. Each pedal lever is provided at its front end with a pedal 6, whilst with the rear end there engages a link 7, 7' which connects the pedal lever to a driving crank 8, 8'. The driving cranks 8, 8' are mounted on a shaft 9. On the latter is mounted a toothed wheel 10 which gears with a toothed wheel 11 on the shaft 2. The method of operation of the drive will be seen from Figs. 2 to 8. In the position in Fig. 2 the pedal lever 5 is at the beginning of the working stroke I. This is almost circular. When the pedal moves downwardly, as shown in Figs. 3 to 5, the pedal lever 5 is set exactly in the direction of the arm of the pedal crank 3. Towards the end of the working stroke I the pedal lever moves into a position which is substantially parallel to the arm of the crank 3. The driving crank 8 drives the rear end of the pedal lever 5 in such a manner that the pedal lever and the pedal crank 3 are rocked downwardly more or less substantially parallel as a rigid unit. The force applied by the foot on the pedal thus acts with a lever arm which corresponds at least approximately with the length $a$ (Fig. 4) of one arm of the pedal crank 3. The driving crank 8 serves to a certain extent as an abutment for the rear end of the pedal lever during the transmission of power.

Shortly before the pedal lever 5 reaches the lower end of the working stroke I, the driving crank 8 actuates the pedal lever 5 so that the latter rocks through a relatively large distance on the crank pin 4 of the pedal crank 3, the rear end of the pedal lever moves rearwardly and the return movement II of the pedal then takes place. This path is substantially shorter than the working stroke I. During the return movement of the pedal, the pedal lever 3' carries out its operating stroke. The operation of the pedal lever 3' is exactly the same as that of the pedal lever 3.

In order to enable the working stroke to be varied the pedal cranks and driving cranks are relatively adjustable. The driving crank 8 is adjustably mounted on the shaft 9 and can be secured to this shaft 9 in various angular positions by means not shown in the drawings. As shown in Fig. 9 the disc 15, provided with pins 16, can be moved axially by means of a cable or the like. The disc 15 can be moved by the rider whilst travelling so that the pins are disengaged from the toothed wheel 11.

It is frequently desirable, when the direction of movement of the pedal 6 changes at the top to allow the passage between the upward and downward movement to take place gradually along the curve III (see Fig. 10). The passage from one direction of movement into the other should be less sharp than along the curve IV with the arrangement according to Fig. 2 as this is more satisfactory to the rider.

In Fig. 11 is shown a construction wherein the wheels 10, 11, instead of being arranged one above the other are arranged horizontally side by side. The pedal lever 5 is rotatably mounted on the pivot 4 of the crank 3. Its rear end is hingedly connected by the link 7 to the crank 8 of the wheel 10.

As shown in Fig. 12 the pedal lever 5 may also be hinged to the crank pin 20 of the crank 8. The crank pin 21 of the crank 3 is then hingedly connected by the link 22 to the pivot 23 of the pedal lever 5. The arrangement can be carried out in such a manner that the point of engagement of the link 22 on the pedal lever 5 may be displaced for the purpose of enabling the size of the curve traversed by the pedal 6 to be varied.

In Fig. 13 is shown a further form of construction. The pedal lever 5 is rotatably mounted on the hinge pin 21 of the crank 3. The hinge pin 25 of the crank 8 is rotatable in the slide block 26. The latter moves in a slot 27 provided at the rear end of the pedal lever 5.

I claim:

1. Pedal drive of the character described comprising two pedal levers adapted to be rocked up and down alternately, a pedal crank, a pivot on said pedal crank, said pedal levers being pivotally mounted on said pivot, driving cranks operatively connected for rotation to said pedal crank, links between said pedal levers and said driving cranks, the arrangement being such that at the commencement of the working stroke the driving cranks set the said pedal levers by means of the said links in a direction for increasing the effective lever arm approximately along an extension of the pedal cranks and so securing the pedal levers and pedal crank relatively to one another that the two parts up to near the end of the working stroke form an extended lever arm which rocks practically as a rigid unit.

2. A pedal drive according to claim 1, wherein the rear ends of the pedal levers are actuated by means of the said driving cranks and the said links.

3. Pedal drive according to claim 1, wherein at least one of the two sets of cranks is adjustable and capable of being locked on its pivot for the purpose of displacing and varying the path of pedals carried at the free ends of said pedal levers.

FRITZ LIENHARD.